United States Patent [19]

Ohkita et al.

[11] Patent Number: 5,796,547
[45] Date of Patent: Aug. 18, 1998

[54] DISK CARTRIDGE AND DRIVE MECHANISM THEREOF

[75] Inventors: Masao Ohkita, Miyagi-ken; Harutaka Sekiya, Fukushima-ken, both of Japan

[73] Assignee: Alps Electric Co., Ltd., Japan

[21] Appl. No.: 722,411

[22] Filed: Oct. 1, 1996

[30] Foreign Application Priority Data

Oct. 26, 1995 [JP] Japan .................. 7-279205

[51] Int. Cl.$^6$ .................................................. G11B 17/028
[52] U.S. Cl. ........................................................ 360/99.04
[58] Field of Search ............................................ 360/99.04

[56] References Cited

U.S. PATENT DOCUMENTS 4,878,139  10/1989  Hasegawa et al. ............. 360/99.02
5,010,427   4/1991  Taguchi et al. ................ 360/99.08
5,528,435   6/1996  Teranishi ........................ 360/104

Primary Examiner—Robert S. Tupper
Attorney, Agent, or Firm—Brinks Hofer Gilson & Lione

[57] ABSTRACT

A disk cartridge and a disk cartridge drive mechanism are disclosed. The disk cartridge includes a flexible recording disk with a hub at the central portion thereof, and a cartridge case containing the recording disk, with the hub having formed therein a chucking hole and a positioning hole. In order to rotate the recording disk by loading it into the disk cartridge drive mechanism, the chucking hole is defined by two straight-line portions that intersect to form a corner against which a spindle shaft of the disk cartridge mechanism is capable of being pushed, and the positioning hole is defined by a contact portion with which a drive pin of the disk cartridge drive mechanism is capable of coming into contact only in the direction of rotation of the recording disk.

3 Claims, 8 Drawing Sheets

DISK CARTRIDGE AND DRIVE MECHANISM THEREOF

BACKGROUND OF THE INVENTION

1. Field of the Invention

The present invention broadly relates to a disk cartridge and a drive mechanism thereof, and, more particularly, to a disk cartridge and a drive mechanism thereof, in which a properly shaped chucking hole and positioning hole are formed in the hub of a flexible recording disk in the disk cartridge, such as a 3.5-inch floppy disk, and a drive pin of the disk cartridge drive mechanism is retained so as to be movable in a proper direction.

2. Description of the Related Art

Hitherto, disk cartridges, such as 3.5-inch floppy disks, have been widely used in various information processing fields, including the computer field. Such disk cartridges are loaded into a disk cartridge drive mechanism and driven in order to record information onto and reproduce information from the flexible recording disk in the disk cartridge.

Well-known disk cartridges, particularly 3.5-inch floppy disks, comprise a flexible recording disk with a metallic hub at the central portion thereof, a cartridge case containing the recording disk with the metallic hub in an exposed state, a shutter which is provided at a portion of the cartridge case and is selectively opened only when recording information into or reproducing information from the recording disk, wherein a chucking hole and a positioning hole are formed in the metallic hub.

Well-known disk cartridge drive mechanisms, particularly those of 3.5-inch floppy disks that are loaded therein, comprise a drive section including a spindle motor for rotationally driving the flexible recording disk in the disk cartridge, and a disk cartridge holding section mounted to the spindle shaft connected to the spindle motor. The disk cartridge holding section comprises a turntable that is fitted to the spindle shaft, a magnetic plate placed on the central portion of the turntable, and a spring member disposed below the central portion of the turntable. When the spindle shaft is fitted to the turntable, an end of the spindle shaft projects out from the central portion of the turntable. The spring member retains a drive pin at one side thereof such that an end of the drive pin, inserted into a hole in the turntable, projects out from the turntable, and such that the drive pin can move in the direction of the axis of the spindle shaft as well as in the direction of the circumference of the turntable.

Figure 5:
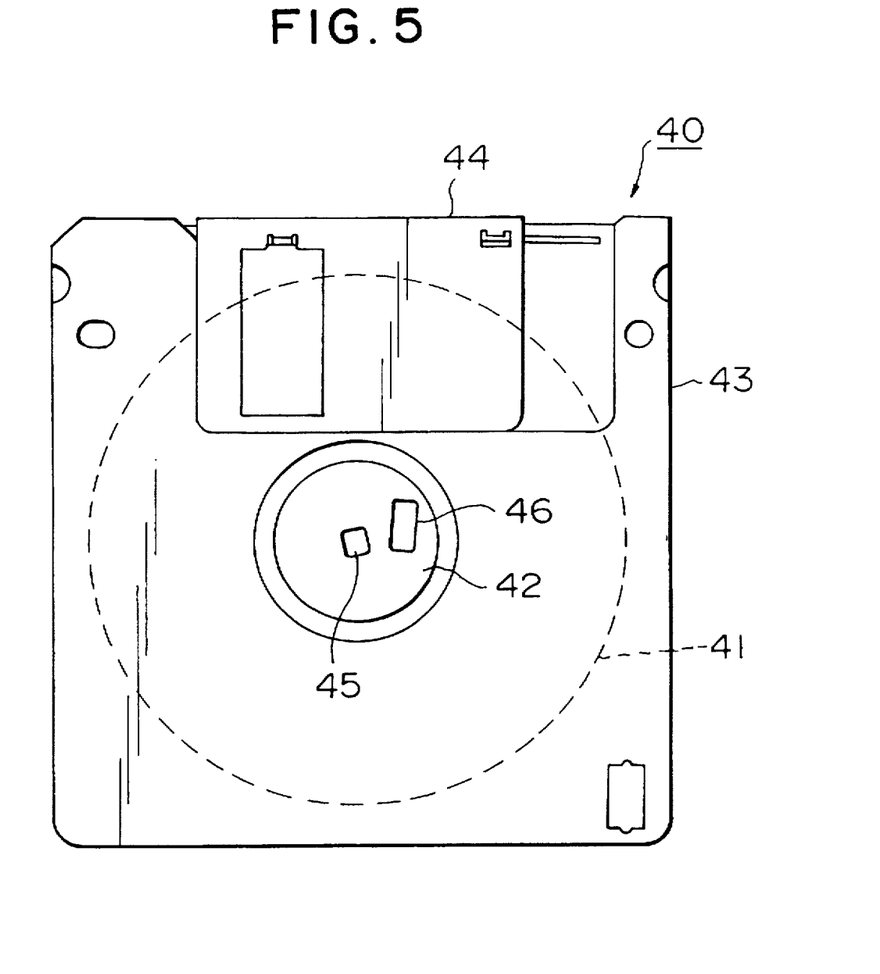
FIG. 5 is a structural view of a conventional 3.5-inch floppy disk.

FIG. 5 is a rear elevational view of a construction of a well-known 3.5-inch floppy disk, as viewed from the metallic hub.

As shown in FIG. 5, the 3.5-inch floppy disk comprises a thin, flexible recording disk 41, with a magnetic recording layer formed on each side thereof, and a circular, metallic hub 42 formed at the central portion thereof; a substantially square-shaped cartridge case 43 containing the recording disk 41 therein with the metallic hub 42 in an exposed state, and a shutter 44 disposed along an edge of the cartridge case 43. A substantially square-shaped chuckling hole is formed in the central portion of the metallic hub 42, while a substantially rectangular shaped positioning hole 46 is formed toward the outer peripheral portion of the metallic hub 42.

Figure 6:
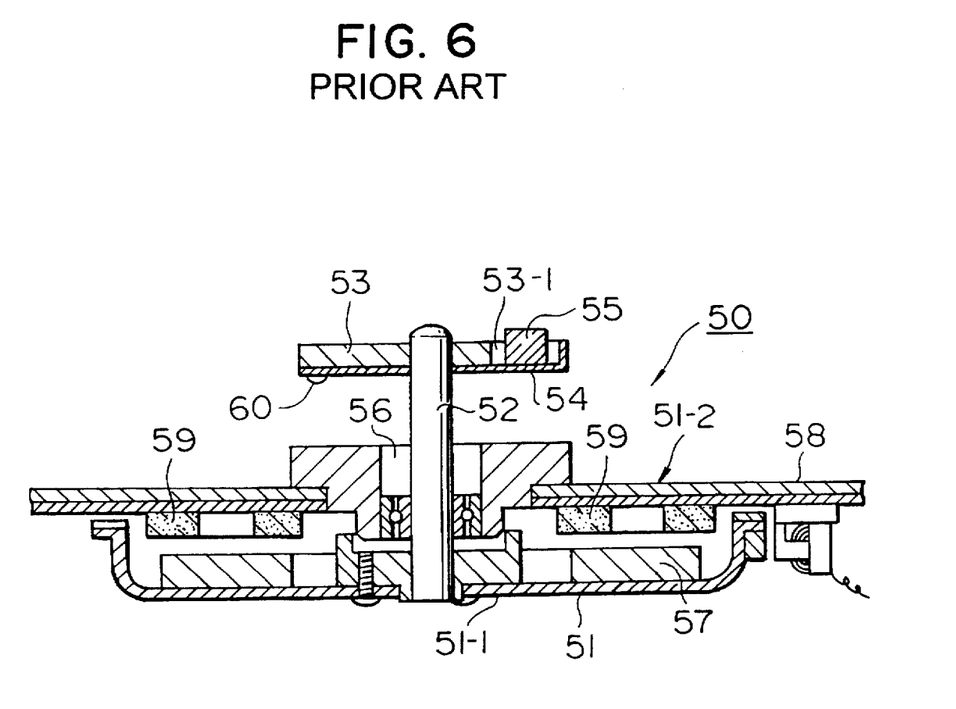
FIG. 6 is a cross sectional view of the critical portion of a conventional floppy disk drive mechanism.
Figure 7:
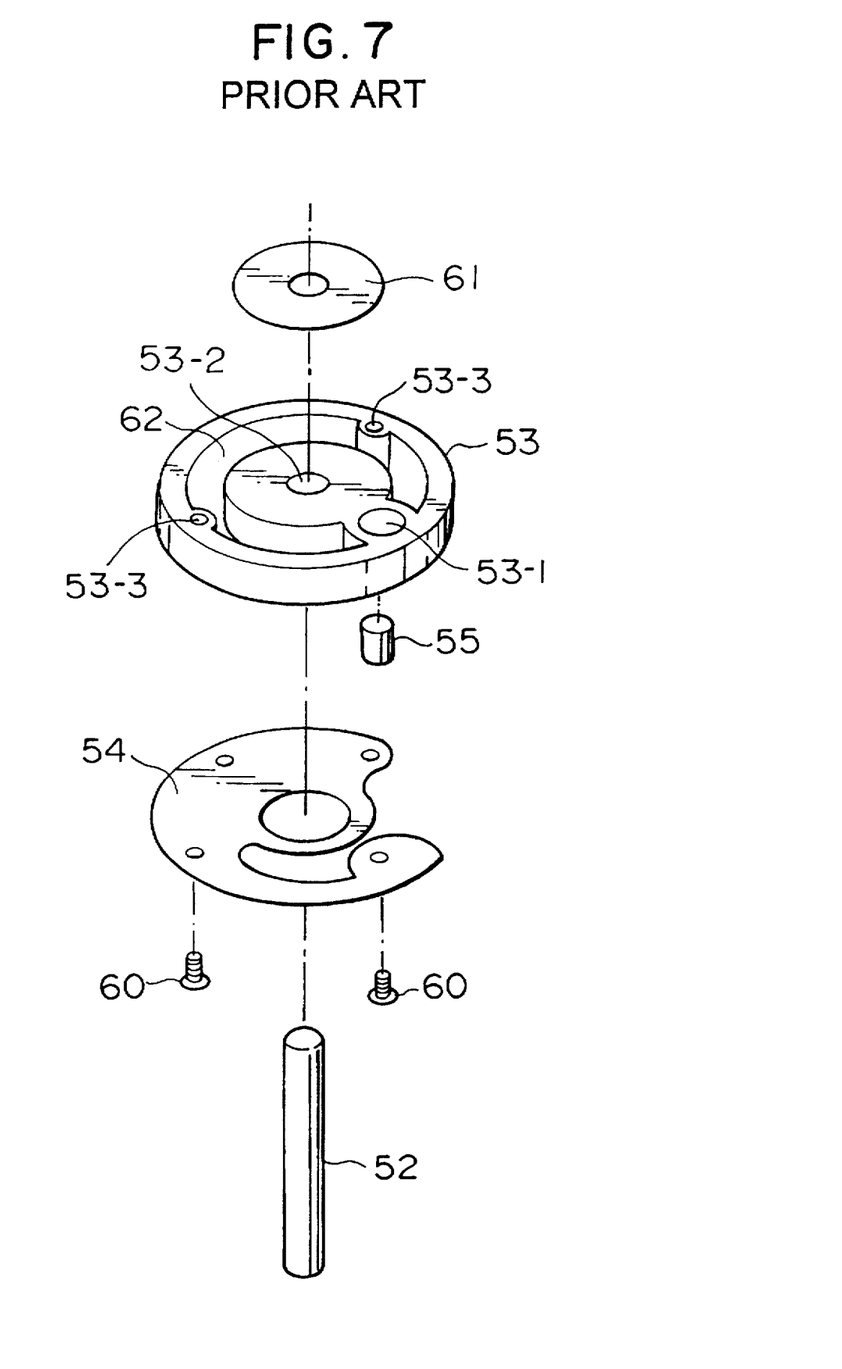
FIG. 7 is an exploded perspective view of the construction of a turntable of the conventional floppy disk drive mechanism.

FIGS. 6 and 7 each illustrate a construction of a floppy disk drive mechanism into which a well-known 3.5-inch floppy disk is loaded to be driven. More specifically, FIG. 6 is a cross sectional view of the critical portion of the floppy disk drive mechanism, while FIG. 7 is an exploded perspective view of the construction of the turntable of the drive mechanism.

Referring to FIGS. 6 and 7, the main component parts of the floppy disk drive mechanism 50 are a spindle motor 51 including a rotor section 51-1 and a stator section 51-2, and coupled to a spindle (rotating) shaft 52; a turntable 53 into which an end of the spindle shaft 52 is fitted; a spring member 54 disposed below the turntable 53; and a drive pin 55 mounted to the spring member 54 and received by a drive pin receiving hole in the turntable 53 so as to project above the turntable 53. The spindle shaft 52 is rotatably supported at the central portion of the stator section 51-2 through a bearing 56. The rotor section 51-1 has an annular magnet 57 in which the magnetization is divided at equal intervals along the direction of the circumference, while the stator section 51-2 has a plurality of drive coils 58 disposed so as to face a magnetic yoke 59 and relative to the magnet 57. In this case, when electrical current is allowed to flow through the plurality of drive coils 58, the drive coils 58 are magnetized such that their magnetization is divided, whereby a torque is generated by the interaction between the field magnetic flux of the magnet 57 and that of the yoke 58, causing the rotor section 51-1 to be rotationally driven relative to the stator section 51-2.

The turntable 53 is provided with drive pin receiving hole 53-1 for passage of the drive pin 55, a central hole 53 for passage of the spindle shaft 52, and a fitting hole 53-3 for passage of an eyelet 60 in order to secure the spring member 54. A disk-shaped plastic sheet 61 is placed on the central portion of the turntable 53, while an annular chucking magnet 62, composed of rubber or the like, is affixed around the outer portion of the plastic sheet 61. The spring member 54, mounted to the turntable 53 through the eyelet 60, is provided below the turntable 53. The drive pin 55 is mounted to an end portion of the spring member 54, an end of which passes through the drive pin receiving hole 53-1 so as to project above the turntable 53. An end of the spindle shaft 52 passes through the central hole 53-2 and the central hole (not denoted by a reference numeral) of the plastic sheet 61 so as to project above the turntable 53.

Figure 8A:
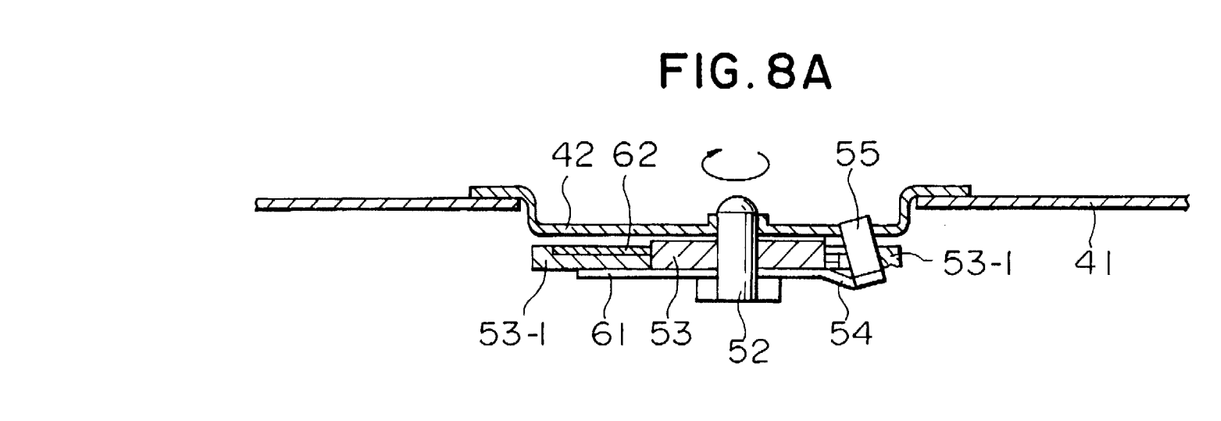
FIG. 8A is a cross sectional view of the critical portion of a conventional disk chucking device for illustrating the case where the floppy disk is placed on the turntable.
Figure 8B:
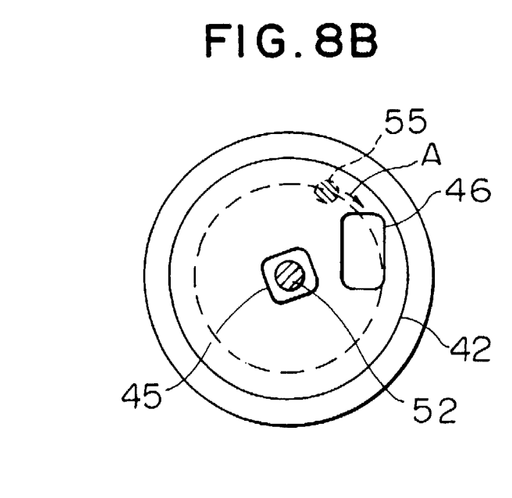
FIGS. 8B to 8D each illustrate operational processes during centering of the floppy disk with respect to the spindle shaft.
Figure 8C:
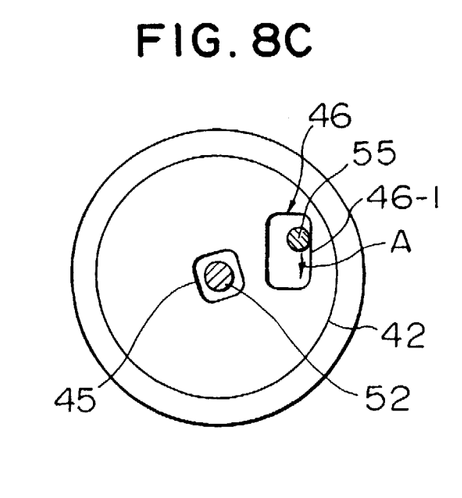
Figure 8D:
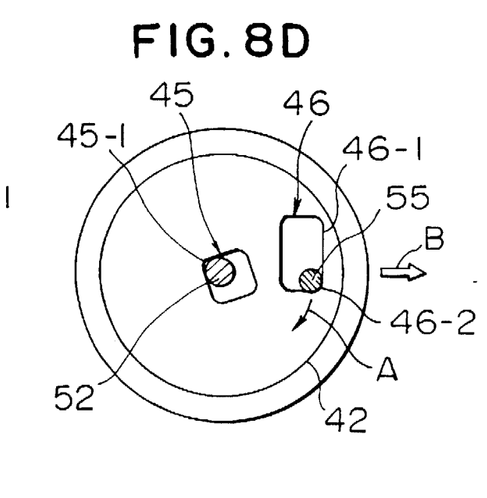

FIG. 8A is a cross sectional view of the critical portion of a well-known chucking device for illustrating the case where a 3.5-inch floppy disk is placed on the turntable. FIGS. 8B to 8D are each illustrative of the operational processes during centering of the 3.5-inch floppy disk with respect to the spindle shaft.

As shown in FIG. 8A, when the 3.5-inch floppy disk 40 is placed on the turntable 53 of the floppy disk drive device 50, the metallic hub 42 of the flexible recording disk 41 is magnetically attracted to the chucking magnet 62 affixed to the turntable 53, causing an end of the spindle shaft 52 to be inserted into the chucking hole in the metallic hub 42, so that an end of the drive pin 55 passes through the positioning hole 46 in the metallic hub 42, during steady operation. As shown in FIG. 8B, in the initial stage of placement of the 3.5-inch floppy disk 40 on the turntable 53, when the metallic hub 42 is magnetically attracted by the chucking magnet 62, the drive pin 55 opposes the resilient force of the spring member 54 and is forced down into the drive pin receiving hole 53-1 in the turntable 53 and below the metallic hub 42. When the drive pin 55 is located below the hub 42, the turntable 53 starts rotating in the direction of arrow A, as a result of rotational driving of the spindle motor 51. When the drive pin 55 projects out below the positioning hole 46 in the metallic hub 42 as a result of rotation of the turntable 53, the drive pin 55 is fitted within the positioning hole 46 by the resilient force of the spring member 54, as shown in FIG. 8A. When the turntable 53 rotates in the direction of arrow A, the drive pin 55 in abutting relation to an outer peripheral side inner edge 46-1 of the positioning hole 46 arrives at an end side inner edge 46-2 in the positioning hole 46, as shown in FIG. 8C. While the drive pin 55 is in contact with the outer peripheral side inner edge 46-1 defining the positioning hole 46, the resilient force of the spring member 54 allows the recording disk 41 and the 3.5-inch floppy disk 40 as a whole to move by means of the metallic hub 42 in the direction of the outer peripheral side inner edge 46-1 defining the positioning hole 46, or in the direction of arrow B, as a result of which the spindle shaft 52 is pushed against a corner 45-1 of the chucking hole 45 located furthest from the positioning hole 46, so as to center the 3.5-inch floppy disk 40 with respect to the spindle shaft 52.

After the 3.5-inch floppy disk 40 has been centered with respect to the spindle shaft 42, the flexible recording disk 41 rotates in the direction of arrow A via the metallic hub 42 with the spindle shaft 52 defined as center, during which recording of information onto and reproducing of information from the recording disk 41 are performed.

In order to chuck the above-described well-known 3.5-inch floppy disk 40 to the above-described well-known floppy disk drive mechanism, it is necessary to provide the substantially square-shaped chucking hole 45 as well as the substantially rectangular-shaped positioning hole 46 in the metallic hub 42 at the central portion of the flexible recording disk 41, so as to fit the spindle shaft 52 of the floppy disk drive mechanism 50 into the chucking hole, and to fit the drive pin 55 into the positioning hole 46. In addition, it is necessary to provide the drive pin 55 in the spring member 54 disposed below the turntable 53 such that the drive pin 55 can move toward and away from the axis of the spindle shaft 52, while it is being resiliently held by the spring member 54.

In the above-described well-known floppy disk drive mechanism 50, the drive pin 55 is provided in the turntable 53 using the spring member 54 which provides a resilient force in order to allow movement toward and away from the axis of the spindle shaft 52. With such a construction, however, it is difficult to obtain spring member 54 with such characteristics, and, in particular, to obtain spring member 54 with such characteristics that can be preserved after long periods of use.

SUMMARY OF THE INVENTION

In order to overcome the above-described problems, a first object of the present invention is to provide a disk cartridge having a properly shaped chucking hole and a properly shaped positioning hole formed therein to allow the drive pin to be retained by the spring member such that the resilient force of the spring member allows the drive pin to move only in the axial direction of the spindle shaft.

A second object of the present invention is to provide a disk cartridge drive mechanism employing a spring member, as a drive pin retaining member, having a simple structure which provides resilient force which allows the drive pin to move only in the axial direction of the spindle shaft.

A third object of the present invention is to provide a disk chucking device in which a properly shaped chucking hole and a properly shaped positioning hole are formed in the flexible recording disk to allow the drive pin to be retained by the spring member such that the resilient force of the spring member allows the drive pin to move only in the axial direction of the spindle shaft.

According to the present invention, in order to load the disk cartridge into the disk cartridge drive mechanism to thereby rotationally drive the disk cartridge, the chucking hole is defined by two straight line portions intersecting to form a corner against which the spindle shaft of the disk cartridge drive mechanism is capable of being pushed, and the positioning hole is defined by a contact portion with which the drive pin of the disk cartridge drive mechanism is capable of coming into contact only in the rotational direction of the flexible recording disk. Therefore, the disk cartridge is one having a drive pin which is resiliently retained by the spring member which allows the pin to move only in the axial direction of the spindle shaft.

According to the present invention, when the spring member, disposed below the central portion of the turntable, retains the drive pin at one end, an end of the drive pin passes through the hole in the turntable so as to project above the turntable, and the drive pin is retained so as to be movable only in the axial direction of the spindle shaft. Therefore, the disk cartridge drive mechanism has a spring member having a simpler structure than conventional spring members of the same type and whose predetermined spring functions can be preserved after long periods of use.

Further, according to the present invention, the disk cartridge has a flexible recording disk with a hub. The hub has formed therein a chucking hole and a positioning hole. The chucking hole is defined by two straight-line portions intersecting to form a corner against which the spindle shaft is capable of being pushed, whereas the positioning hole is defined by a contact portion with which the drive pin is capable of coming into contact only in the rotating direction of the flexible recording disk. When such a disk cartridge is being chucked with a disk cartridge drive mechanism having spindle shaft and a drive pin retained in such a manner as to be movable only in the direction of the shaft, the spindle shaft is pushed against the corner of the chucking hole, and the flexible recording disk is rotationally driven on the disk cartridge drive mechanism while the drive pin is in contact with the contacting portion defining the positioning hole, whereby the flexible recording disk is centered with respect to the spindle shaft. Therefore, the disk chucking device is one in which the chucking hole and the positioning hole formed in the flexible recording disk are of the proper shapes, allowing the drive pin to be held by the spring member such that the elastic force of the spring member allows the drive pin to move only in the axial direction of the spindle shaft.

DESCRIPTION OF THE PREFERRED EMBODIMENT

A description will now be given of the preferred embodiment with reference to the drawings.

Figure 1:
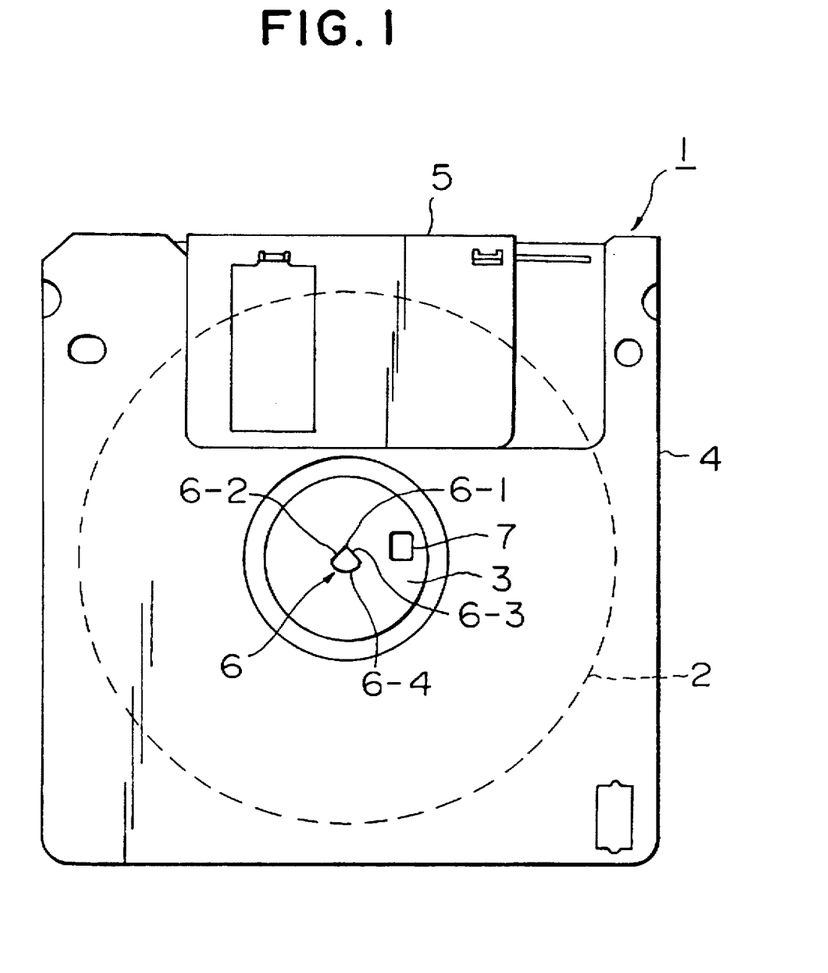
FIG. 1 is a structural view of a disk cartridge (a 3.5-inch floppy disk) in accordance with the present invention.

FIG. 1 is a rear elevational view of a structure of a disk cartridge, being in this case a 3.5-inch floppy disk, as viewed from the metallic hub side.

As shown in FIG. 1, the 3.5-inch floppy disk 1 comprises a thin, flexible recording disk 2, with a magnetic recording layer on each side thereof and a circular, metallic hub 3 at the central portion thereof; a substantially square-shaped cartridge case 4, made of hard plastic or the like, containing therein the recording disk 2; and a shutter 5 extending along an edge of the cartridge case 4. A substantially fan-shaped chucking hole 6 is disposed in the central portion of the metallic hub 3, and is defined by two straight-line portions 6-2 and 6-3 and a semicircular portion 6-4. The straight-line portions 6-2 and 6-3 intersect to a form corner 6-1, and the semicircular portion 6-4 and the straight-line portions 6-2 and 6-3 are joined together at a location opposite the corner 6-1. A substantially square-shaped positioning hole 7 is formed toward the outer peripheral portion of the metallic hub 3. The 3.5-inch floppy disk 1 has essentially the same construction as the conventional 3.5-inch floppy disk 40 of FIG. 40, except that the chucking hole 6 and the positioning hole 7 in the metallic hub 3 are shaped differently from those formed in the conventional floppy disk 40.

Figure 2A:
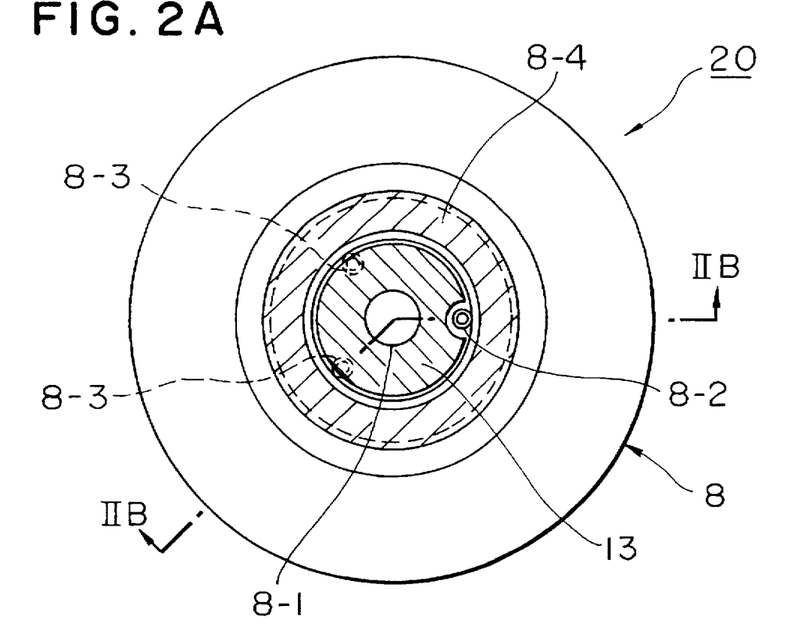
FIGS. 2A to 2C are structural views of a turntable in a disk cartridge (floppy disk) drive mechanism for loading and driving the 3.5-inch floppy disk of FIG. 1 in accordance with the present invention.
Figure 2B:
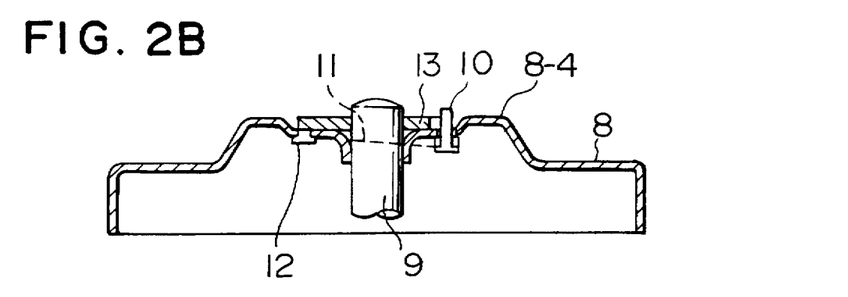
Figure 2C:
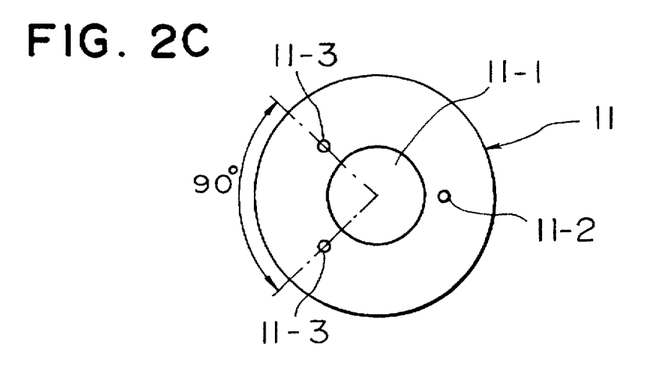

FIGS. 2A to 2C are each structural views of a turntable in the disk cartridge (floppy disk) drive mechanism for loading and driving the 3.5-inch floppy disk of FIG. 1. More specifically, FIG. 2A is a top view of the turntable. FIG. 2B is a cross sectional view taken along line IIB—IIB of FIG. 2A. FIG. 2C is a plan view of a spring member.

As shown in FIGS. 2A and 2B, the turntable 8 of the floppy disk drive mechanism 20 has formed therein a central hole 8-1 for passage of a spindle shaft 9, a drive pin receiving hole 8-2 for passage of a drive pin 10, and a fitting hole 8-3 for passage of fastener 12 for securing a spring member 11. An annular chucking magnet 13, made of rubber, is affixed to the central portion of the upper surface of the turntable 8, and an annular outer portion 8-4 is formed around the affixing region of the chucking magnet 13. The outer portion 8-4 bulges slightly upward so that it is of the same height as the chucking magnet 13 affixing region, and defines, along with the chucking magnet 13 affixing region, the portion on the turntable where the 3.5-inch floppy disk 1 is placed. As shown in FIG. 2C, a spring member 11 is disposed below the turntable 8, and has formed therein a central hole 11-1, a drive pin fitting hole 112, and two eyelet fitting holes 11-3, with the drive pin fitting hole 11-2 and the two fastener fitting holes 11-3 formed such that a circle formed by connecting the holes is concentric to the center of the disk-shaped spring member 11. The spring member 11 is mounted to two locations on the turntable 8 by fitting the drive pin 10 into the drive pin fitting hole 11-2 and fitting the two fasteners 12 into their respective fastener fitting holes 11-3. For this reason, the drive pin 10 mounted to the spring member 11 is subjected to the resilient force of the spring member 11 or opposes the resilient force of the spring member 11, so that it is not capable of moving in any other direction except in the axial direction of the spindle shaft 9. The resilient force of the spring member 11 normally causes an end of the drive pin 10 to pass through the drive pin receiving hole 8-2 in the turntable 8 so as to project above the turntable 8, and an end of the spindle shaft 9 to pass through the central hole 8-1 in the turntable so as to project above the turntable 8.

FIGS. 2A to 2C only illustrate the construction of the turntable 8 in the disk cartridge (floppy disk) drive mechanism 20 in accordance with the present invention. That is, they do not show the construction of the portion including the spindle (rotating) motor coupled to the spindle shaft 9, since it is exactly the same as that of the conventional floppy disk drive mechanism 50 of FIG. 6.

Figure 3A:
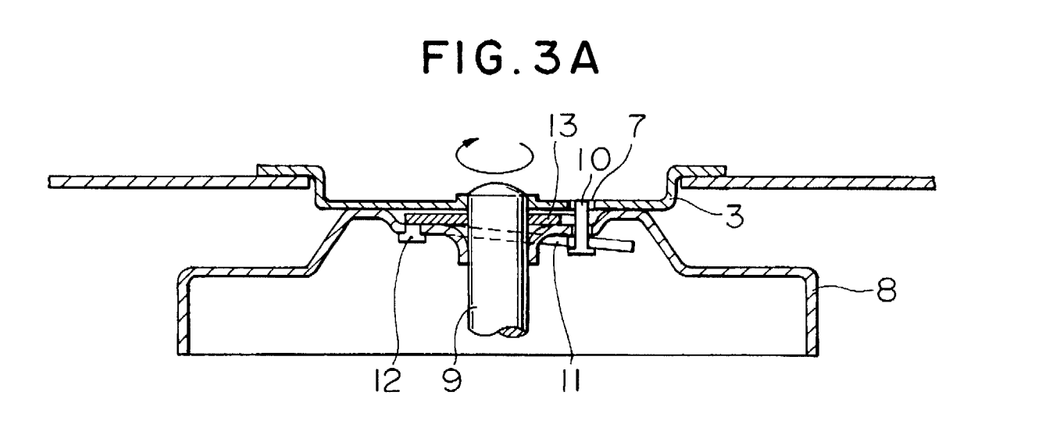
FIG. 3A is a cross sectional of the critical portion of a disk chucking device for illustrating the case where the disk cartridge (floppy disk) is placed on the turntable.
Figure 3B:
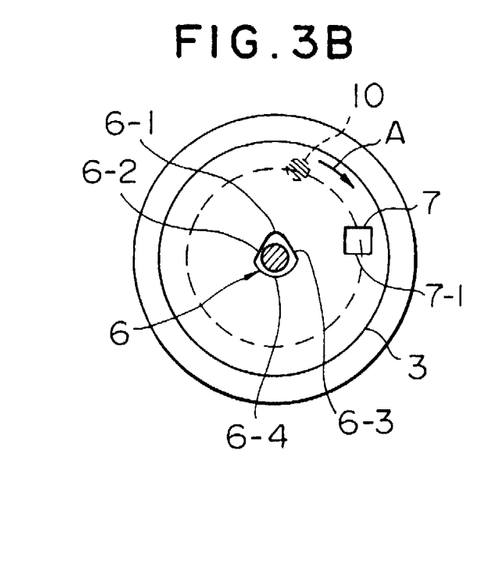
FIGS. 3B to 3D illustrate the operational processes during centering of the recording disk with respect to the spindle shaft.
Figure 3C:
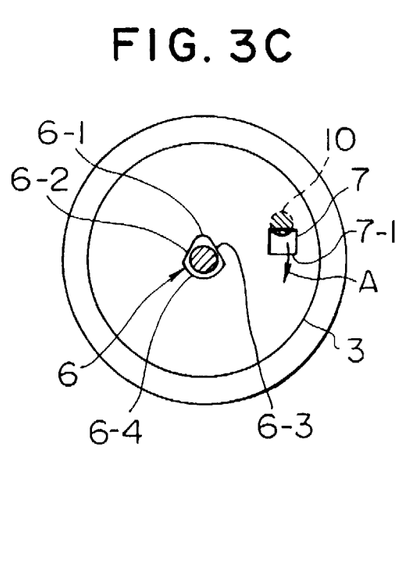
Figure 3D:
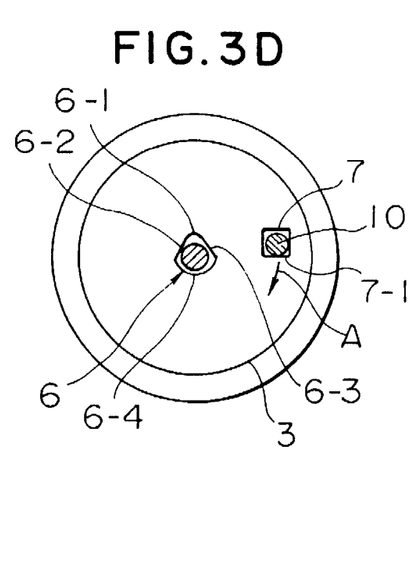

FIG. 3A is a cross sectional view of the critical portion of the disk chucking device for illustrating the case where the 3.5-inch floppy disk 1 is placed on the turntable. FIGS. 3B to 3D illustrate the operational processes during centering of the 3.5-inch floppy disk 1 with respect to the spindle shaft.

With reference to FIGS. 3A to 3D, a description will be given of the operational processes during centering of the 3.5-inch floppy disk 1 with respect to the spindle shaft 9, when the disk 1 is being loaded into and driven by the disk cartridge (floppy disk) drive mechanism 20.

As shown in FIG. 3A, when the 3.5-inch floppy disk 1 is placed on the turntable 8 of the floppy disk drive mechanism, the metallic hub 3 of the flexible disk 2 is magnetically attracted to the chucking magnet 13 affixed to the turntable 8, causing an end of the spindle shaft 9 to be inserted into the chucking hole 6 in the metallic hub 3, so that an end of the drive pin 10 is inserted into the positioning hole 7 in the metallic hub 3, during steady operation. In the initial stage of placement of the 3.5-inch floppy disk 1 on the turntable 8, as shown for example in FIG. 3B, when the metallic hub 3 is magnetically attracted by the chucking magnet 13, the drive pin 10 is pushed by the hub 3, opposes the resilient force of the spring member 11, and is forced down into the drive pin receiving hole 8-2 in the turntable 8 and below the metallic hub 3. When this occurs, the turntable 8 starts rotating in the direction of arrow A as a result of the rotational driving of the spindle motor (not shown). When the drive pin 10 comes near the lower portion of the positioning hole 7 in the metallic hub 3 as a result of the rotation of the turntable 8, as shown in FIG. 3C, the drive pin 10 is fitted into the positioning hole 7 as a result of the resilient force of the spring member 11, as shown in FIG. 3A. Further rotation of the turntable 8 in the direction of arrow A causes the drive pin 10 to contact an end side inner edge 7-1 defining the positioning hole 7. When the turntable 8 further rotates in the direction of arrow A, the drive pin 10 presses strongly against the end side inner edge 7-1 defining the positioning hole 7, while in contact therewith. In reaction to this, the spindle shaft 9 is forced toward a corner 6-1, defined by two straight-line portions, of the chucking hole 6, as a result of which the flexible recording disk 2 and the 3.5-inch floppy disk 1 as a whole are positioned as shown in FIG. 3D via the metallic hub 3, with the 3.5-inch floppy disk 1 being centered with respect to the spindle shaft 9.

Even in the present invention, after centering of the 3.5-inch floppy disk 1 with respect to the spindle shaft 9, the flexible recording disk 2 rotates in the direction of arrow A around the spindle shaft 9 defined as center via the metallic hub 3, during which information is recorded onto and reproduced from the recording disk 2.

FIGS. 4A to 4F are plan views of various combinations of the chucking hole 6 and the positioning hole 7 with different shapes, which can be formed in the disk cartridge (floppy disk) in accordance with the present invention.

Figure 4A:
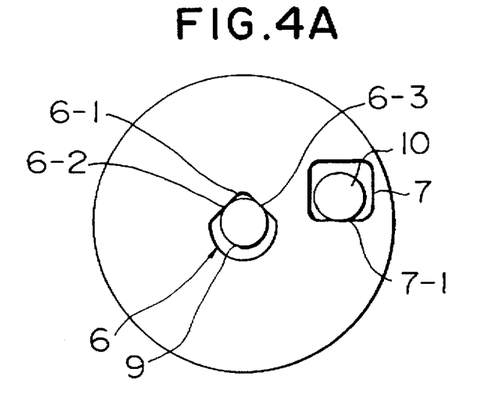
FIGS. 4A to 4F are plan views of various combinations of chucking hole and positioning hole with different shapes, which can be formed in the disk cartridge (3.5-inch floppy disk) in accordance with the present invention.

In the first combination shown in FIG. 4A, the chucking hole 6 is fan-shaped, with the two straight-line portions 6-2 and 6-3 intersecting at an angle of about 90° to form the corner 6-1. The positioning hole 7 is substantially square-shaped, as in the foregoing description.

Figure 4B:
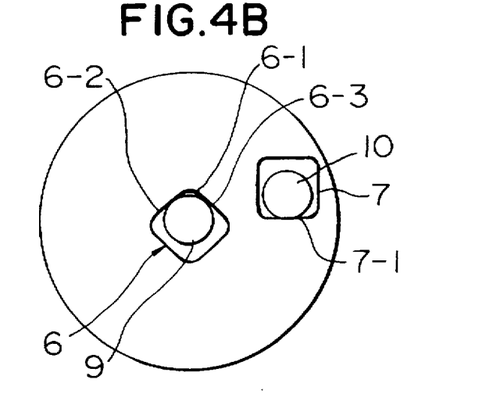

In the second combination shown in FIG. 4B, the chucking hole 6 is substantially square-shaped, with the two straight-line portions 6-2 and 6-3 intersecting at an angle of about 90° to form the corner 6-1. The positioning hole 7 is substantially square-shaped.

Figure 4C:
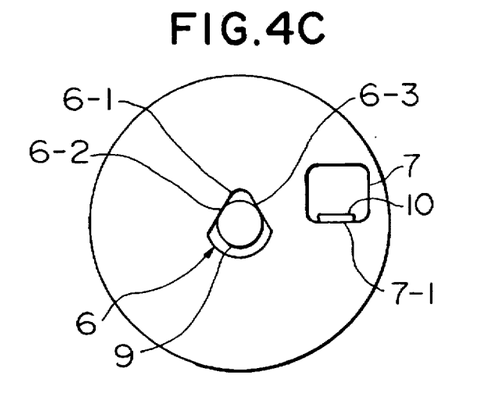

In the third combination shown in FIG. 4C, the chucking hole 6 is fan-shaped, with the two straight-line portions 6-2 and 6-3 intersecting at an angle of about 60° to form the corner 6-1. The positioning hole 7 is substantially square-shaped, and the drive pin 10 is rectangular in a transverse plane.

Figure 4D:
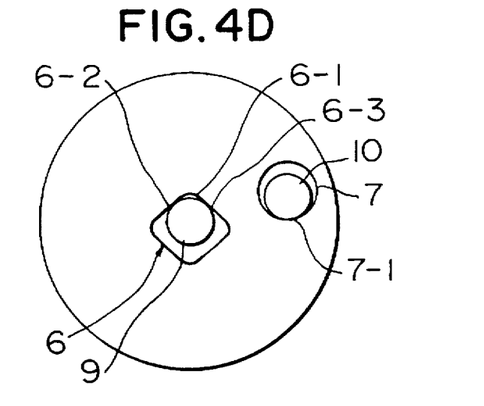

In the fourth combination shown in FIG. 4D, the chucking hole 6 is substantially square-shaped, with the two straight-line portions 6-2 and 6-3 intersecting at an angle of about 90° to form the corner 6-1. The positioning hole 7 is substantially circular in shape.

Figure 4E:
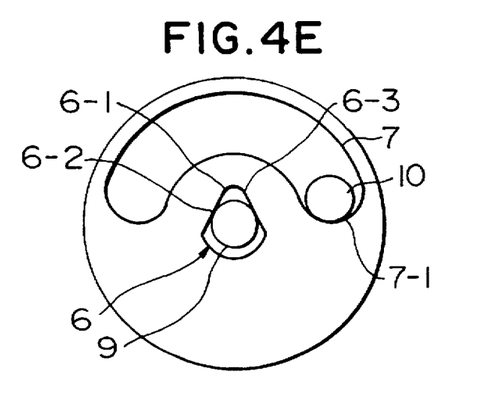

In the fifth combination shown in FIG. 4E, the chucking hole is fan-shaped, with the two straight-line portions 6-2 and 6-3 intersecting at an angle of about 60° to form the corner 6-1. The positioning hole 7 is shaped into a semicircular arc.

Figure 4F:
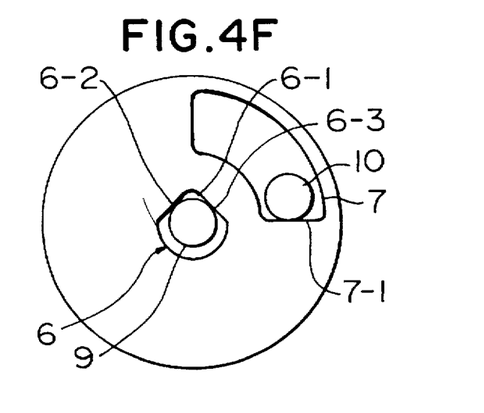

In the sixth combination shown in FIG. 4F, the chucking hole 6 is fan-shaped, with the straight-line portions 6-2 and 6-3 intersecting at an angle of about 90° to form the corner 6-1. The positioning hole 7 is shaped into a semicircular arc.

In the sixth combination shown in FIG. 4F, the chucking hole 6 is fan-shaped, with the straight-line portions 6-2 and 6-3 intersecting at an angle of about 90° to form the corner 6-1. The positioning hole 7 is arc-shaped, with the arc being a quarter of a circular arc.

The chucking hole 6 may be formed into any shape, as long as the two straight-line portions 6-2 and 6-3 intersect at an angle in the range of from not less than 30° to not more than 90° to form the corner 6-1. On the other hand, the positioning hole 7 may come in any shape as long as it has an end side inner edge 7-1 with which the drive pin 10 comes into contact.

As can be understood from the foregoing description, the circular hub formed at the central portion of the flexible recording disk 2 may be composed of any material as long as the material is hard material, although in the foregoing description the circular hub was described as being metallic.

As can be understood from the foregoing description, according to the present invention, the disk cartridge is not limited to a 3.5-inch floppy disk, and the disk cartridge drive mechanism is not limited to a 3.5-inch floppy disk drive mechanism, though in the foregoing description the 3.5-inch floppy disk and the 3.5-inch floppy disk drive mechanism were taken as examples. Thus, it is obvious that any disk cartridge or disk cartridge drive mechanism may be used, as long as the disk cartridge and the drive mechanism thereof are essentially similar in construction to the 3.5-inch floppy disk and the 3.5-inch floppy disk drive mechanism, respectively.

What is claimed is:

1. A disk cartridge drive mechanism comprising:

a drive section including a spindle motor for rotationally driving a flexible recording disk; and a disk cartridge holding section mounted to a spindle shaft of the spindle motor; wherein said disk cartridge holding section includes:

(i) a turntable having said spindle shaft fitted to a central portion thereof such that an end of said spindle projects out from the central portion thereof, and having a disk cartridge support provided at the central portion thereof, (ii) a magnetic plate placed on the central portion of the turntable, and (iii) a spring member disposed below the central portion of the turntable; and a drive pin, wherein the spring member is disk-shaped and is connected to the turntable by a plurality of fasteners arranged concentrically with respect to a center of the spring member, and retains the drive pin at one side thereof such that an end of the drive pin, inserted into a hole of the turntable, projects out above the turntable and such that the drive pin is movable only in an axial direction of the spindle shaft.

2. A disk cartridge for use with a disk cartridge drive mechanism, the disk cartridge drive mechanism including a drive section having a spindle shaft and a drive pin, the disk cartridge comprising:

a cartridge case defining an opening;

a flexible recording disk rotatably received in the cartridge case, the flexible recording disk including a central hub which is exposed through the opening of the cartridge case, the hub including a chucking hole located at a center of the hub, and a positioning hole;

wherein when the disk cartridge is mounted in the disk cartridge drive mechanism, the spindle shaft is received in the chucking hole and the drive pin is received in the positioning hole, the positioning hole being configured such that the drive pin only contacts an edge of the positioning hole in a rotating direction of the recording disk; and wherein the chucking hole includes two straight edges meeting at a corner, the two straight edges defining an angle in a range of 30 to 90 degrees and having a bisector which is aligned in a direction opposed to the rotating direction of the recording disk such that the corner of the chucking hole is forced toward the spindle shaft when the drive pin presses against the edge of the positioning hole.

3. An assembly comprising:

a disk cartridge drive mechanism including a drive section including a spindle motor having a spindle shaft, and a disk cartridge holding section mounted to the spindle shaft, the disk cartridge holding section including a turntable and a spring member disposed below the turntable, and a drive pin mounted on the spring member and extending trough a hole formed in the turntable; and a disk cartridge including a cartridge case defining an opening, and a flexible recording disk rotatably received in the cartridge case, the flexible recording disk including a central hub which is exposed through the opening of the cartridge case, the hub including a chucking hole and a positioning hole;

wherein the spring member is disk-shaped and is connected to the turntable by a plurality of fasteners arranged concentrically with respect to a center of the spring member, and the spring member retains the drive pin at one side thereof such that an end of the drive pin projects through the hole of the turntable such that the drive pin is movable only in an axial direction of the spindle shaft, wherein when the disk cartridge is mounted in the disk cartridge drive mechanism, the spindle shaft is received in the chucking hole and the drive pin is received in the positioning hole, the positioning hole being configured such that the drive pin only contacts an edge of the positioning hole in a rotating direction of the recording disk, and wherein the chucking hole is formed in a center of the hub and includes two straight edges meeting at a corner, the two straight edges defining an angle in a range of 30 to 90 degrees and having a bisector which is aligned in a direction opposed to the rotating direction of the recording disk such that the corner of the chucking hole is forced toward the spindle shaft when the drive pin presses against the edge of the positioning hole.

* * * * *

UNITED STATES PATENT AND TRADEMARK OFFICE
CERTIFICATE OF CORRECTION

PATENT NO. : 5,796,547
DATED : August 18, 1998
INVENTOR(S) : Masao Ohkita et al.

It is certified that error appears in the above-indentified patent and that said Letters Patent is hereby corrected as shown below:

<u>In the Claims</u>

In Claim 2, line 19, replace "comer" with --corner--.

In Claim 3, line 8, replace "trough" with --through--.

In Claim 3, line 32, replace "comer" with --corner--.

In Claim 3, line 36, replace "comer" with --corner--.

Signed and Sealed this

First Day of June, 1999

*Attest:*

Q. TODD DICKINSON

*Attesting Officer*    Acting Commissioner of Patents and Trademarks